United States Patent
Tsuchiya (10) Patent No.: US 8,215,746 B2
(45) Date of Patent: Jul. 10, 2012

(54) DEVICES AND METHODS FOR PRINT CONTROL AND BOTTOM EDGE PROCESSING

(75) Inventor: Takeshi Tsuchiya, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 692 days.

(21) Appl. No.: 12/380,953

(22) Filed: Mar. 5, 2009

(65) Prior Publication Data

US 2009/0225122 A1 Sep. 10, 2009

(30) Foreign Application Priority Data

Mar. 5, 2008 (JP) .................................. 2008-054460

(51) Int. Cl.
 *B41J 2/15* (2006.01)
 *B41J 2/145* (2006.01)
(52) U.S. Cl. ................................ 347/40; 347/41; 347/16
(58) Field of Classification Search ...................... 347/15, 347/16, 20, 40–43
 See application file for complete search history.

(56) References Cited

U.S. PATENT DOCUMENTS

2005/0088472 A1* 4/2005 Nunokawa ...................... 347/16

FOREIGN PATENT DOCUMENTS

| JP | 11-268344 | | 10/1999 |
| JP | 2005-081780 | * | 3/2005 |

* cited by examiner

*Primary Examiner* — Juanita D Jackson
(74) *Attorney, Agent, or Firm* — Nutter McClennen & Fish LLP; John J. Penny, Jr.; Derek P. Roller (57) ABSTRACT

A printing device includes a printing process section configured so as to be capable of performing a first printing process in which, in synchronization with transporting of a printing medium performed at intervals of a predetermined constant transport amount, respective printing operations are performed on the printing medium, and a second printing process in which, in synchronization with transporting of the printing medium performed at intervals of a smaller constant transport amount than the predetermined constant transport amount, respective printing operations are performed on the printing medium; a searching section configured to search for a final printing line position of printing image data to be printed on the printing medium from an end edge of a printable area on the printing medium; and a selecting section configured to select either of the first printing process or the second printing process in accordance with the final printing line position of the printing image data obtained by the searching section.

6 Claims, 9 Drawing Sheets

DEVICES AND METHODS FOR PRINT CONTROL AND BOTTOM EDGE PROCESSING

BACKGROUND

1. Technical Field

The present invention relates to a printing device adopting an interlaced printing method, and further, a control method, a printing control device and a printing control program used for the printing device. "A printing device" in this patent description is one of printing devices which include a so-called multifunctional printer integrating therein functions of a scanner, a photocopier and so on in addition to a function of printing.

2. Field of Invention

The interlaced printing method is well known to those skilled in the art as a method which enables realization of printing of high quality. In the interlaced printing method, printing is performed on a printing medium, not at intervals of the width of a print head, but under the condition where, even when an area targeted for printing has a width equal to the width of the print head, scanning operations using the print head are performed plural times in synchronization with transporting of the printing medium performed in small steps. This method enables realization of printing at a higher resolution than a resolution at which printing is performed at intervals of a nozzle pitch of ink nozzles mounted on the print head.

In the case of performing printing by means of the interlaced printing method, printing on the whole of a printing medium by means of the interlaced printing method leads to scanning operations using the print head across a bottom edge of the printing medium (i.e., an end edge in the direction of transport of the printing medium). Therefore, even after the printing medium is pushed out from a transporting mechanism, the print head moves over the printing medium, and this operation is likely to degrade the quality of printing. In order to prevent this degradation, a method of so-called bottom edge processing, in which each printing operation is performed in synchronization with transporting of the printing medium performed by a smaller constant transport amount than a constant transport amount by which the printing medium is transported in a normal interlaced printing method, has been performed (refer to, for example, JP-A-11-268344 and JP-A-2005-81780).

However, the bottom edge processing is not always necessary for printing, and further, in order to automatically determine whether the bottom edge processing is necessary, or not, from content of data and printing conditions of a target for printing, due to an uncertainty in correspondence relations between the locations of the printing medium and the locations of the print head, it is necessary to retain raster data included in the target for printing so as to deal with the uncertainty, and further, the necessity of retaining the raster data leads to an increase in the amount of consumed memory. Thus, it is difficult to realize the automatic bottom edge processing in a printing environment where a small amount of memory is required in the printing device, such as a stand-alone printing environment.

SUMMARY

Accordingly, it is desirable to provide a printing device, a printing device control method, a printing control device and a printing control program which are capable of performing the automatic bottom edge processing in a printing environment where a small amount of consumed memory is required.

According to a first aspect of the invention, there is provided a printing device which includes a printing process section configured so as to be capable of performing a first printing process in which, in synchronization with transporting of a printing medium performed at intervals of a predetermined constant transport amount, respective printing operations are performed on the printing medium, and a second printing process in which, in synchronization with transporting of the printing medium performed at intervals of a smaller constant transport amount than the predetermined constant transport amount, respective printing operations are performed on the printing medium, a searching section configured to search for a final printing line position of printing image data to be printed on the printing medium from an end edge of a printable area on the printing medium, and a selecting section configured to select either of the first printing process or the second printing process in accordance with the final printing line position of the printing image data obtained by the searching section.

Preferably, the printing device according to the first aspect of the invention further includes a transporting mechanism configured to transport the printing medium at the upstream side of the transporting direction of the printing medium, and a print head configured to perform printing in conjunction with moving in the direction orthogonal to the transporting direction, wherein the selecting section selects the first printing process in the case where the final printing line position of the printing image data does not reach a second reference position, selects the second printing process in the case where the final printing line position of the printing image data reaches the second reference position or exceeds the second reference position but does not reach a first reference position, and selects the first printing process in the case where the final printing line position of the printing image data reaches the first reference position or exceeds the first reference position, wherein the first reference position is a line position on the printing medium corresponding to a timing at which an end edge of the printing medium in the transporting direction is released from the transporting mechanism, and wherein the second reference position is a line position at which changing from the first printing process to the second printing process is required so as to allow the print head to perform printing under the condition where the position of the print head does not exceed the first reference position.

Preferably, in the printing device according to the first aspect of the invention, the printing image data targeted for searching performed by the searching section includes pieces of image data each representing respective color values of red, green and blue colors for one pixel.

Preferably, in the printing device according to the first aspect of the invention, the searching section is configured to obtain an average value of respective color values of red, green and blue colors for each pixel included in the printing image data; in the case where the average value associated with a pixel is higher than or equal to a first predetermined color density threshold value, determine the line position of the pixel to be a final printing line position of the printing image data; in the case where the average value associated with a pixel is lower than the first predetermined color density threshold value and is higher than or equal to a second predetermined color density value which is smaller than the first predetermined color density threshold value, regard the pixel as a pixel corresponding to a dot which possibly requires discharging of an ink; and in the case where the number of the dots which possibly require discharging of an ink is more than or equal to a value determined in advance for dots located in the same direction orthogonal to the transporting direction, determine a line position at which pixels corresponding to the dots are arranged to be a final printing line position of the printing image data.

According to a second aspect of the invention, there is provided a control method used for a printing device configured so as to be capable of performing a first printing process in which, in synchronization with transporting of a printing medium performed at intervals of a predetermined constant transport amount, respective printing operations are performed on the printing medium, and a second printing process in which, in synchronization with transporting of the printing medium performed at intervals of a smaller constant transport amount than the predetermined constant transport amount, respective printing operations are performed on the printing medium, and the control method includes searching for a final printing line position of printing image data to be printed on the printing medium from an end edge of a printable area on the printing medium, and selecting either of the first printing process or the second printing process in accordance with the final printing line position of the printing image data obtained in the searching method.

According to a third aspect of the invention, there is provided a printing control device for performing control of a printing device configured so as to be capable of performing a first printing process in which, in synchronization with transporting of a printing medium performed at intervals of a predetermined constant transport amount, respective printing operations are performed on the printing medium, and a second printing process in which, in synchronization with transporting of the printing medium performed at intervals of a smaller constant transport amount than the predetermined constant transport amount, respective printing operations are performed on the printing medium, and the printing control device includes a searching section configured to search for a final printing line position of printing image data to be printed on the printing medium from an end edge of a printable area on the printing medium, and a selecting section configured to select either of the first printing process or the second printing process in accordance with the final printing line position of the image data obtained by the searching section.

According to a fourth aspect of the invention, there is provided a printing device control program executed by a computer for performing control of a printing device configured so as to be capable of performing a first printing process in which, in synchronization with transporting of a printing medium performed at intervals of a predetermined constant transport amount, respective printing operations are performed on the printing medium, and a second printing process in which, in synchronization with transporting of the printing medium performed at intervals of a constant transport amount smaller than the predetermined constant transport amount, respective printing operations are performed on the printing medium, and the printing device control program includes a searching process for searching for a final printing line position of printing image data to be printed on the printing medium from an end edge of a printable area on the printing medium, and a selecting process for selecting either of the first printing process or the second printing process in accordance with the final printing line position of the printing image data obtained in the searching process.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
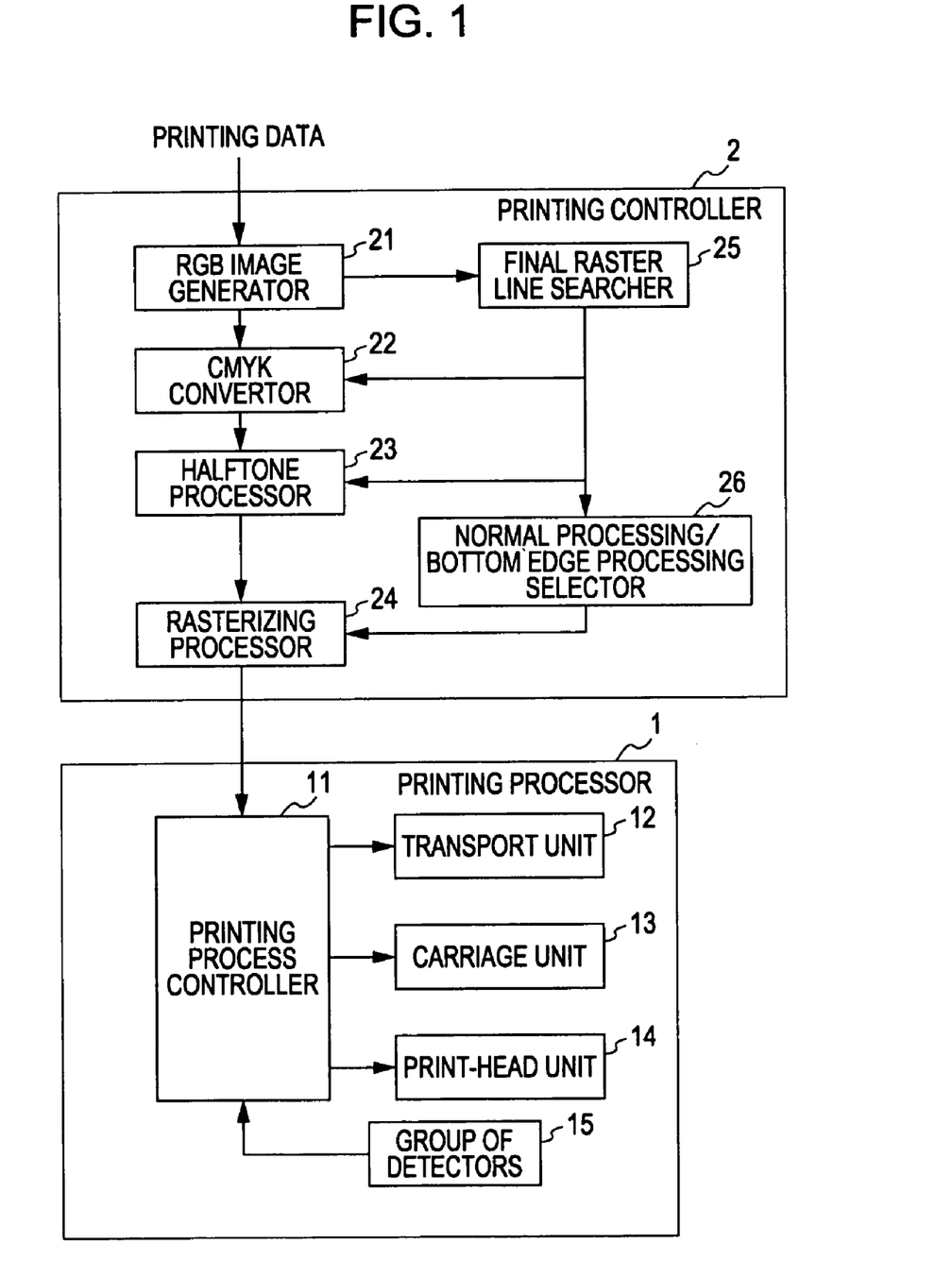
FIG. 1 is a block diagram illustrating a configuration of a first embodiment of the invention, and shows an example in which certain aspects of the invention are applied to a printing device which performs stand-alone printing.

FIG. 1 is a block diagram illustrating a configuration of a first embodiment of the invention, and shows an example in which certain aspects of the invention are applied to a printing device which performs stand-alone printing. The printing device includes a printing processor 1 functioning as a printing process section capable of performing two print processes, one being a first printing process (which will be hereinafter termed "normal processing") in which a printing operation is performed on a printing medium every time the printing medium is transported by a predetermined constant transport amount, the other one being a second printing process (which will be hereinafter termed "bottom edge processing") in which a printing operation is performed on a printing medium every time the printing medium is transported by a smaller constant transport amount than the predetermined constant transport amount; and a printing controller 2 configured to perform control so as to cause the printing processor 1 to execute the printing.

The printing processor 1 includes a print processing controller 11, a transport unit 12 operating as a mechanism for printing, a carriage unit 13, a print head unit 14, and a group of detectors 15 for detecting operation conditions of individual sections. The transport unit 12 transports a printing medium, such as a sheet of paper. The carriage unit 13 carries the print head 14 in a direction orthogonal to the direction of transporting of the printing medium performed by the transport unit 12. The print head unit 14 discharges certain kinds of inks onto the printing medium from a plurality of ink nozzles mounted thereon. The print processing controller 11 performs control of individual sections in accordance with raster data supplied from the printing controller 2.

The printing controller 2 includes an RGB image generator 21, a CMYK convertor 22, a halftone processor 23, a rasterizing processor 24, a final raster line searcher 25, and a normal processing/bottom edge processing selector 26. The RGB image generator 21 generates RGB (red, green and blue color) printing image data from inputted textual data and/or image data. The CMYK convertor 22 converts the RGB image data into CMYK data, which is represented by respective color values of ink colors such as cyan, magenta, yellow and black (to which a hypochromic color or the like may be added). The halftone processor 23 performs halftone processing for determining the locations to which certain kinds of inks are to be discharged in accordance with densities of respective CMYK colors. The rasterizing processor 24 sequentially generates pieces of printing data for each line (i.e., each raster line) on a dot-by-dot basis and sends the resultant pieces of printing data for each raster line to the printing processor 1 as a block of raster data, and also, notifies the printing processor 1 of the necessity of performing the bottom edge processing. In association with the RGB image data generated by the RGB image generator 21, the final raster line searcher 25 operates as a searcher configured to search for a final printing line position of the RGB image data on the printing medium from the end edge of a printable area of the printing medium. The normal processing/bottom edge processing selector 26 operates as a selector configured to select either of the normal processing mode or the bottom edge processing mode on the basis of the final printing line position of the RGB image data obtained by the final raster line searcher 25.

Interlaced Printing Method

Figure 2:
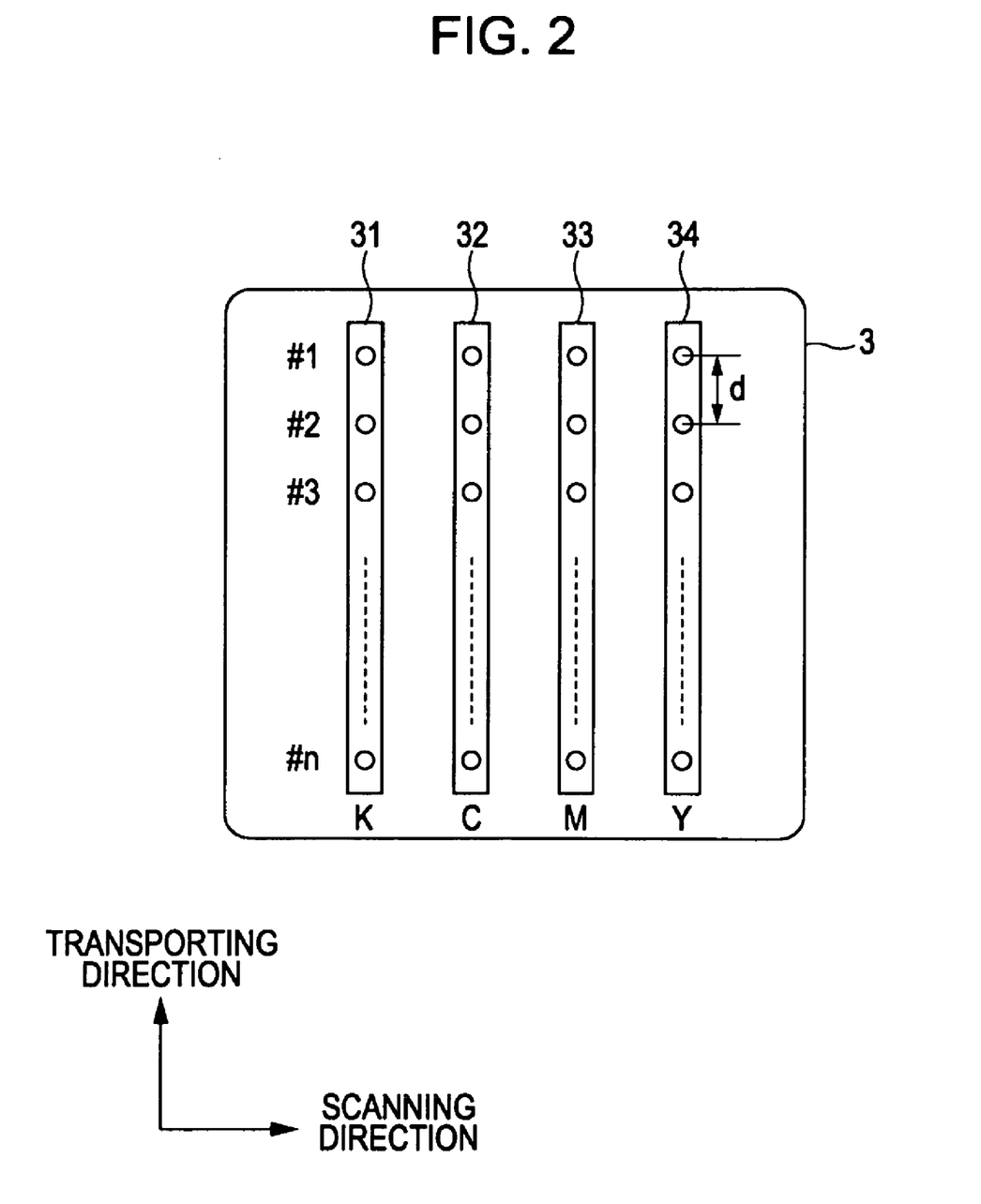
FIG. 2 is a diagram illustrating a configuration of a print head.
Figure 3:
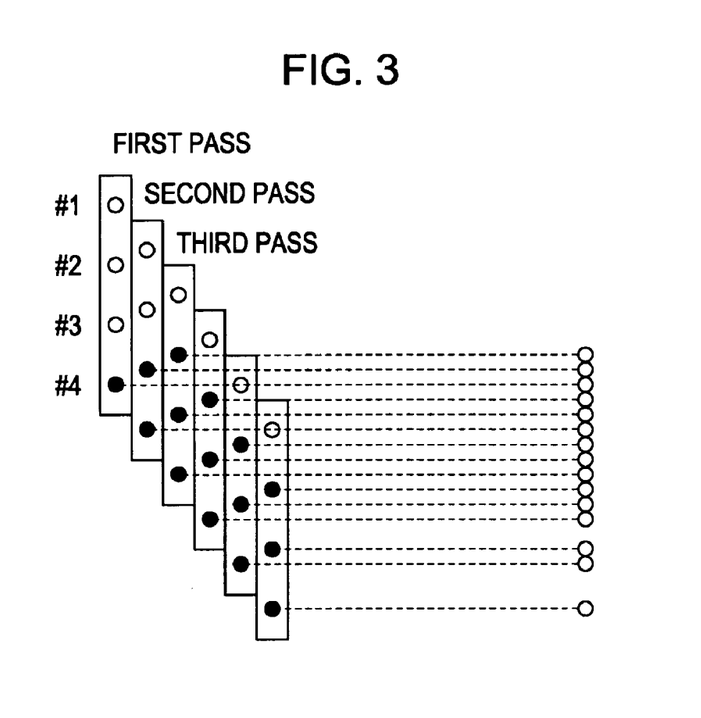
FIG. 3 is a diagram illustrating an example of simple interlaced printing operations.
Figure 4:
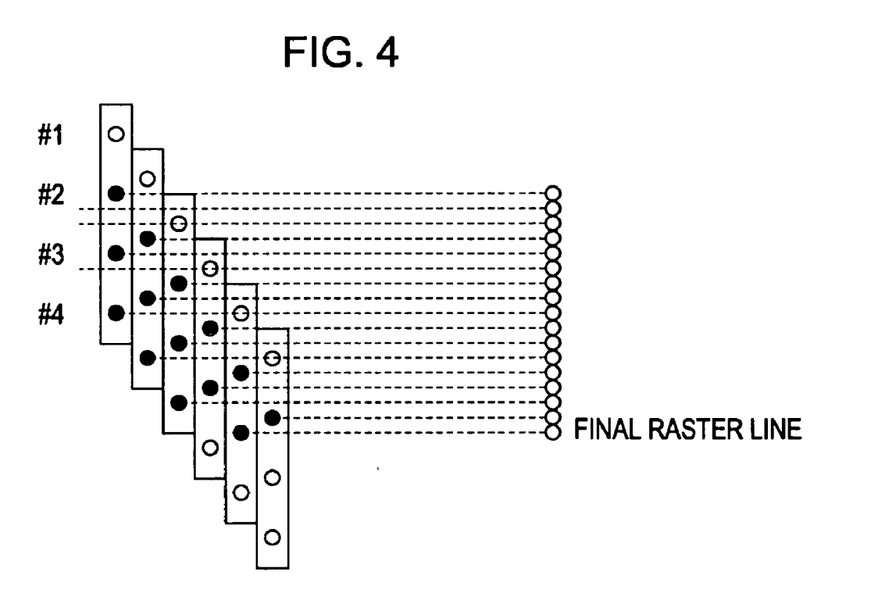
FIG. 4 is a diagram illustrating an example of interlaced printing operations without a bottom edge processing.

Hereinafter, the interlaced printing method will be described with reference to FIGS. 2 to 4. FIG. 2 illustrates an example of a configuration of a print head, FIG. 3 illustrates an example of interlaced printing operations, and FIG. 4 illustrates an example of interlaced printing operations in the case where the bottom edge processing is not performed.

As shown in FIG. 2, the print head 3 includes groups of nozzles 31 to 34, which correspond to inks of black and CMY colors, respectively, each having n nozzles (for example, n=180) arranged in a row in the direction of transport of the printing medium. The groups of nozzles 31 to 34 are arranged mutually in parallel in the direction of scanning of the print head 3, and discharge respective color inks to the same dot location in conjunction with the scanning operations performed by the print head 3. One nozzle pitch d of each group of the nozzles corresponds to one dot pitch in the direction of transport of the printing medium, which leads to printing at a minimum resolution under the condition where printing is actually performed, and, the interlaced printing method enables realization of printing at a higher resolution.

One example of interlaced printing operations will be hereinafter described with reference to FIG. 3. In this example, for the sake of simplification, let us assume that the number of nozzles of the print head which are mounted in the direction of transport of the printing medium is four, and a transport amount of the printing medium every time the print head performs a scanning operation is ¾ of the nozzle pitch. Further, it is assumed that a printing start position is located at a position to which the printing medium is transported forward (i.e., in the upward direction in FIG. 3) from the position of a fourth nozzle of the print head performing a first scanning operation (i.e., a first pass). In this case, during the first pass, only the fourth nozzle of the print head performs printing. Subsequently, during a second pass, a third nozzle and the fourth nozzle of the print head perform printing. During the second pass, the third nozzle can perform printing on dots located at positions to which the printing medium is transported forward by ¼ distance of the nozzle pitch from the position of dots on which the printing was completed during the first pass. During a third pass, a second nozzle, the third nozzle and the fourth nozzle perform printing. In the following, in the same manner as, or in a manner similar to, that described above, it is possible to perform printing at a resolution which is four times a resolution at which printing is performed at intervals of one nozzle pitch.

A method of printing on an area up to a final raster line by means of the interlaced printing method will be hereinafter described with reference to FIG. 4. In the case where the bottom edge processing is not performed, as a result, the print head performs scanning operations across the bottom edge of a printing medium. This operation leads to a problem in that the print head performs scanning operations across the bottom edge of the printing medium (i.e., across the end edge in the direction of transport). As a result, the printing medium is pushed out from the mechanism for transporting the printing medium, and even under the condition where users can take out the printing medium, the print head moves on the printing medium, and this operation is likely to degrade the quality of printing.

Necessity of Bottom Edge Processing

Figure 5:
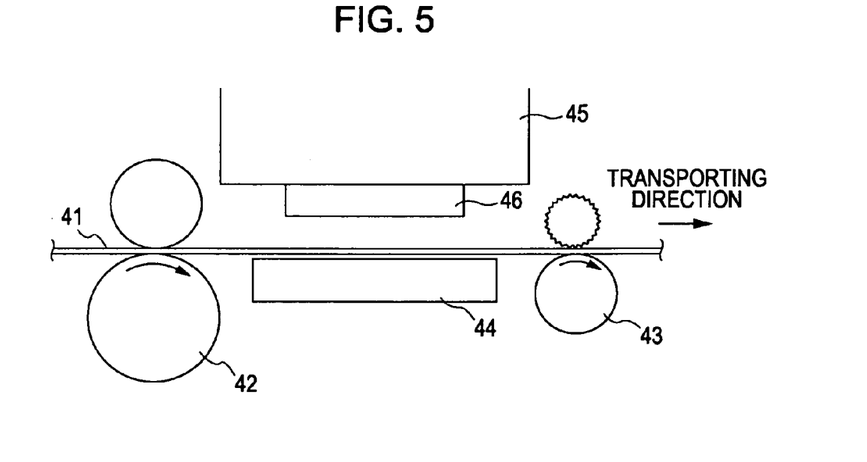
FIG. 5 is a diagram illustrating a mechanism for transporting a printing medium under the condition where the printing medium is nipped.
Figure 6:
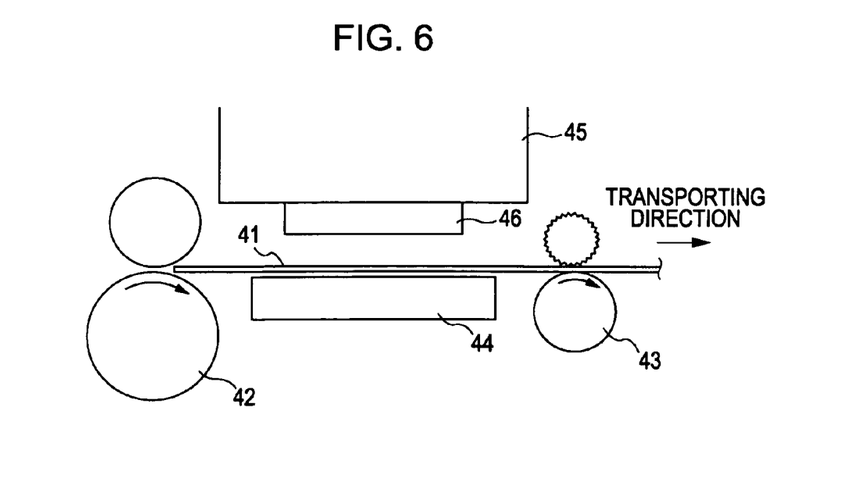
FIG. 6 is a diagram illustrating a mechanism for transporting a printing medium under the condition where a printing medium is unnipped.

FIGS. 5 and 6 are diagrams each illustrating an example of a mechanism for transporting a printing medium, and with reference to these diagrams, the necessity of the bottom edge processing will be hereinafter described. A printing medium 41 is transported along a platen 44 by transport rollers 42 and a paper ejection roller 43. A carriage 45 carries the print head 46, which performs scanning operations, in the direction orthogonal to the direction of transporting of the printing medium 41. A condition where the printing medium is pinched by two transport rollers 42 is termed "Nipping". However, as shown in FIG. 6, once the printing medium is released from pinching performed by the transport rollers 42, a difference error between an actual transport amount of paper and a logical transport amount of paper arises. A total transport amount of paper including the difference error is termed "Kicking". Once "Kicking" has occurred, a positional relationship between the locations of nozzles during the (N+1)-th pass and the locations of nozzles during the N-th pass, and so on become misaligned, and as a result, the quality of printing is degraded. Further, if the printing medium 41 has cockles and bulges (which are termed "cockling"), the printing medium is likely to be rubbed by the print head 46. This phenomenon is termed "rubbing between a print head and paper". The rubbing between a print head and paper is likely to stain the printing medium 41. Under the condition where the printing medium is nipped, tension generated in the direction of transport reduces occurrence of the rubbing between a print head and paper.

Automatic Bottom Edge Processing

Figure 7:
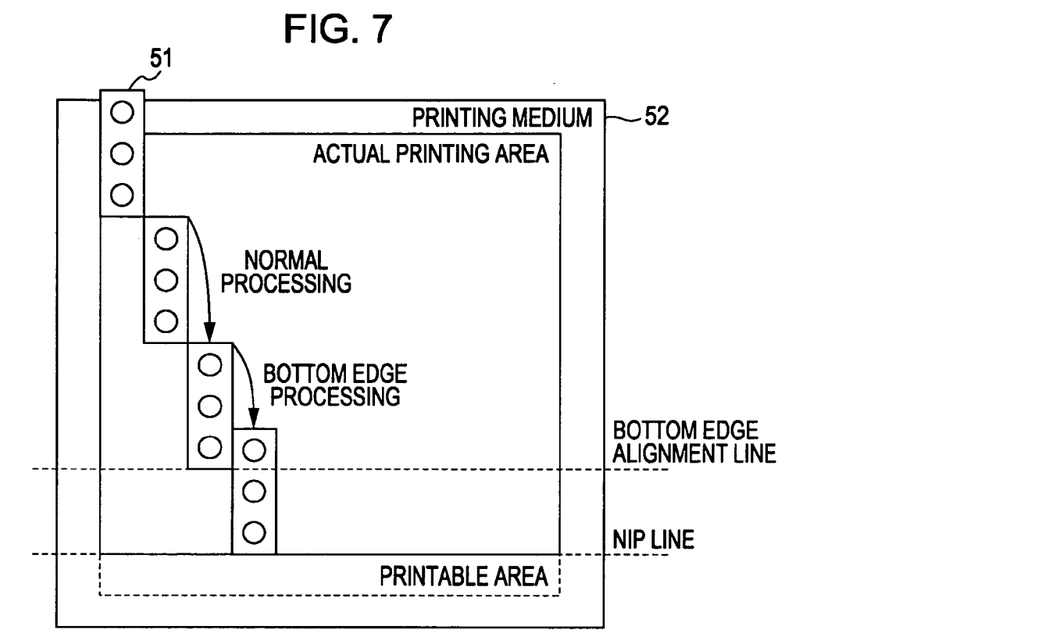
FIG. 7 is a diagram used for describing an automatic bottom edge processing in the case where a bottom edge processing is performed.
Figure 8:
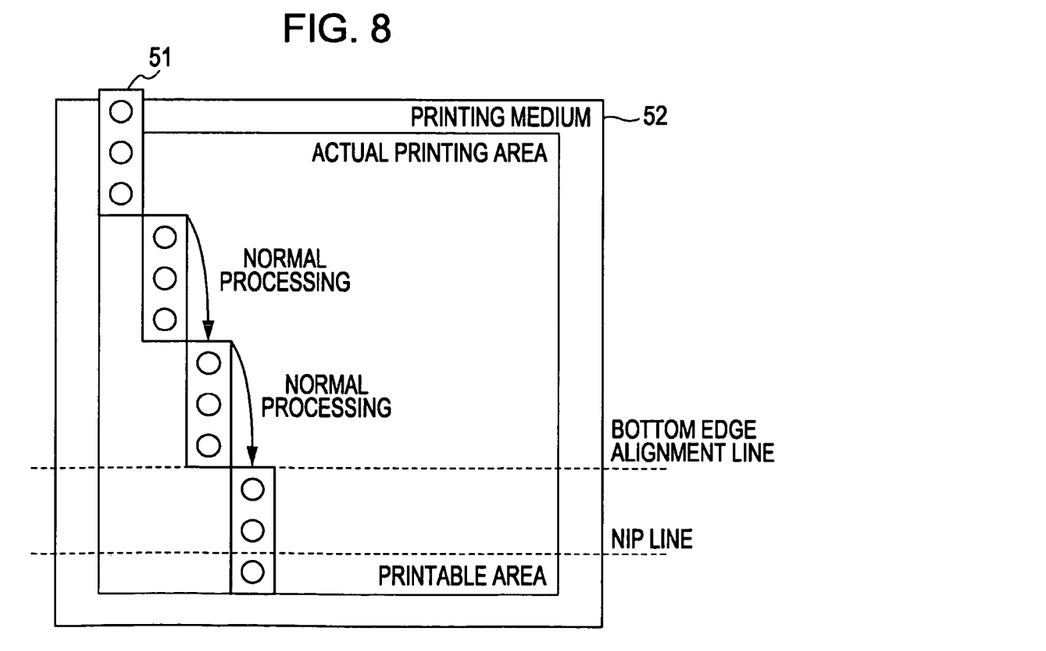
FIG. 8 is a diagram used for describing an automatic bottom edge processing in the case where a bottom edge processing is not performed.

FIGS. 7 and 8 are diagrams used for describing the automatic bottom edge processing, and FIG. 7 illustrates a case where the automatic bottom edge processing is performed, while FIG. 8 illustrates a case where the automatic bottom edge processing is not performed. For the sake of simplification, the description will be hereinafter made on the assumption that the number of nozzles of the print head 51 is three, and in the normal printing mode, the printing medium 52 is transported at intervals of a distance of three printing dots. Further, it is assumed that, the printing medium 52 is transported at intervals of a distance of two printing dots in the bottom edge processing mode, and the number of passes (i.e., the number of scanning operations) is one. In addition, in each of FIGS. 7 and 8, certain conditions where the print head 51 is shifted in small steps in the vertical direction are illustrated; however, actually, the printing medium 52 is transported in the direction from a bottom to a top of the figure. Moreover, in FIGS. 7 and 8, for each scanning operation, a position of the print head 51 is illustrated at the side of an immediately previous position of the print head 51.

In order to prevent the above-described rubbing between a print head and paper and also degradation of the quality of image due to kicking, in the case where the size of an image targeted for printing is large enough for the printing device to complete printing of the image under the condition where the printing medium is nipped, the bottom edge processing is performed. On the other hand, in the case where the size of an image targeted for printing is not so large, and as a result of performing the bottom edge processing, the printing device performs printing under the condition where the printing medium is unnipped, it is necessary for the printing device to complete printing of the image subsequent to completion of scanning operations in only the normal processing mode. These two kinds of processing modes are switched with each other on the basis of a final raster line position of an actual printing area. That is, assuming that a line associated with a printing area on the printing medium 52, which corresponds to a border line above which the printing medium 52 is transported under the nipped condition, is termed a nip line, and further, another line associated with the printing area on the printing medium 52, which corresponds to a line position of a back edge of the print head 51 performing a scanning operation immediately preceding a scanning operation in the normal processing mode performed by the print head 51 (which is located at the lowest position in FIGS. 7 and 8, i.e., at the most upstream side of transporting) the back edge of which is beyond the nip line, is termed a bottom edge alignment line. Once the back edge of the print head 51 reaches the bottom edge alignment line, it is determined on the basis of the position of the final raster line of the actual printing area whether the bottom edge processing is to be performed, or not, for a subsequent scanning operation.

Figure 9:
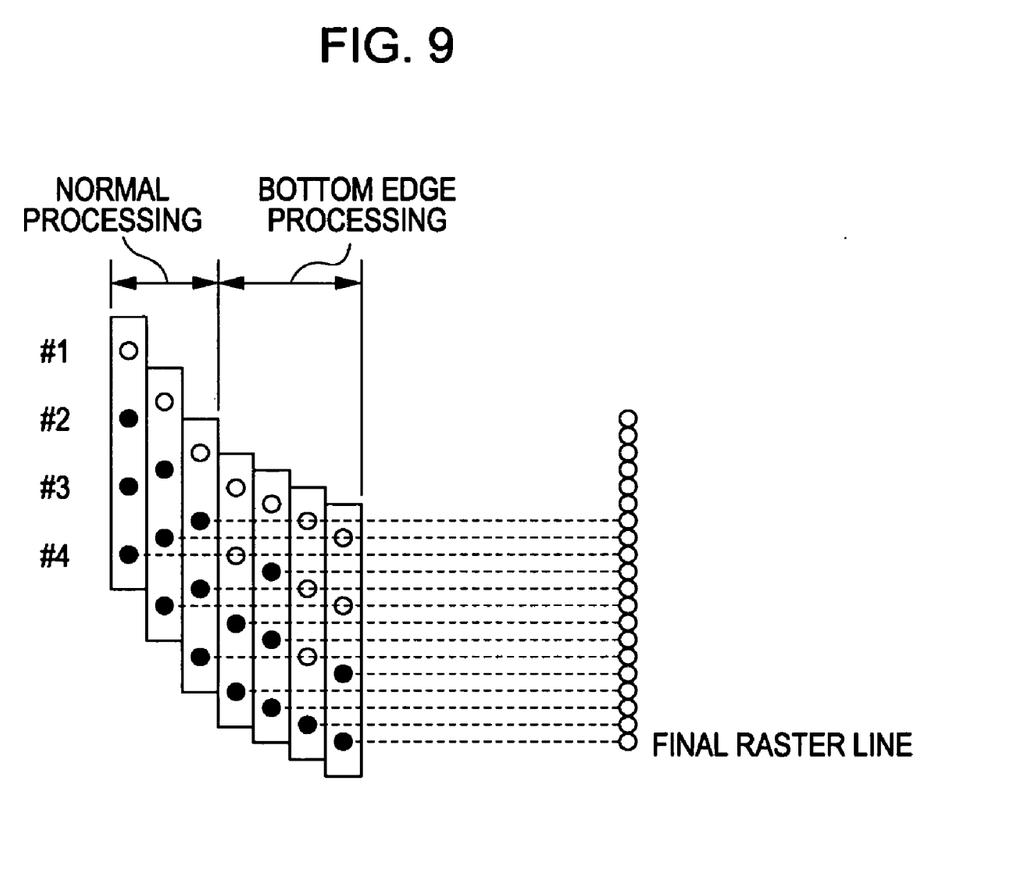
FIG. 9 is a diagram illustrating an example of a bottom edge processing in an interlaced printing method.

In the case where the final raster line of the actual printing area is located at a position the same as that of the nip line, as shown in FIG. 7, a subsequent scanning operation in the normal processing mode causes the back edge of the print head 51 to exceed the bottom edge alignment line, however, a subsequent scanning operation in the bottom edge processing mode does not cause the back edge of the print head 51 to exceed the nip line, and moreover, enables printing on an area up to the final raster line of the actual printing area. In such a case as described above, it is determined the bottom edge processing is to be performed. On the other hand, in the case where the final raster line of the actual printing area is located at the end edge of a printable area, as shown in FIG. 8, a subsequent scanning operation in the normal processing mode causes the back edge of the print head 51 to exceed the bottom edge alignment line, and further, even one more subsequent scanning operation in the bottom edge processing mode results in incompletion of printing on the area up to the final raster line of the actual printing area. Further, even if at all further scanning operations 51 are performed in the bottom edge processing mode, as a result, the back edge of the print head 51 exceeds the nip line. That is, the printing on the area up to the final raster line of the actual printing area causes the print head 51 to exceed the nip line. In this case, the printing is allowed to continue on an area up to the final raster line of the actual printing area under the condition where the bottom edge processing is not performed. FIG. 9 illustrates an example of the bottom edge processing in the interlaced printing method shown in FIGS. 3 and 4.

Automatic Bottom Edge Processing and Memory Consumption

In the automatic bottom edge processing, as shown in FIGS. 7 and 8, the normal processing mode is switched to the bottom edge processing mode at the timing when the back edge of the print head 51 has moved beyond the bottom edge alignment line. Therefore, it is necessary for the printing process controller 11 shown in FIG. 1 to be aware of the position of the final raster line of the actual printing area in advance before the back edge of the print head 51 moves beyond the bottom edge alignment line.

In existing printing devices, raster data is transferred from an upper module (which is equivalent to the printing controller 2 shown in FIG. 1) to an interlaced printing process module (which is equivalent to the printing processor 1 or the printing process controller 11 shown in FIG. 1), and then, in the interlaced printing process module, the transferred raster data is buffered in a memory device. Furthermore, upon completion of transferring all pieces of raster data, the upper module notifies the interlaced printing process module of the completion. Therefore, it is impossible for the interlaced printing process module to become aware of the position of the final raster line of the actual printing area prior to receipt of the notification regarding the completion of transferring all pieces of raster data. Accordingly, in order to perform the automatic bottom edge processing, it is necessary for the interlaced printing process module to complete buffering of additional pieces of raster data with respect to an area up to the final raster line of the actual printing area in advance before the back edge of the print head 51 moves beyond the bottom edge alignment line, and as a result, the interlaced printing process module including the automatic bottom edge processing mode requires a larger amount of memory than an amount of memory required in the interlaced printing process module not including the automatic bottom edge processing mode. For this reason, stand-alone type printing devices having an insufficient amount of memory mounted therein are not capable of performing the automatic bottom edge processing, and further, even in such a printing environment as a printing device supported by a PC connected thereto, it follows that a printing operation performed in a high resolution printing mode and on paper of a large size requires too large an amount of memory to be consumed for the printing device to perform the automatic bottom edge processing.

Comparison from an Aspect of the Amount of Consumed Memory

Respective amounts of consumed memory in two printing modes, one being a first printing mode in which the automatic bottom edge processing is not performed, the other one being a second printing mode in which the automatic bottom edge processing is performed, are represented as two formulae: the amount of consumed memory in the first printing mode=the number of raster lines targeted for scanning operations on a print-head-by-print-head basis x the number of bytes of raster data per one raster line x the number of color inks; and the amount of consumed memory in the second printing mode= (the number of raster lines targeted for scanning operations on a print-head-by-print-head basis+the number of raster lines from an actual printing area end edge to a nip line+the total number of scanning operations in the bottom edge processing mode)×the number of bytes of raster data per one raster line×the number of color inks.

Assuming that the resolution is 2880×1440, the size of a printing medium is A3, the number of raster lines targeted for scanning operations on a print-head-by-print-head basis is 1432 lines, the number of bytes of raster data per one raster line is 8250 bytes, the number of color inks is 7, the number of raster lines from an actual printing area end edge to a nip line is 832 lines, and the total number of scanning operations in the bottom edge processing mode is 101, results obtained by using the above-described two formulae are as follows: the amount of consumed memory in the first printing mode in which the automatic bottom edge processing is not performed=1432×8250×7=82.698 MB; and the amount of consumed memory in the second printing mode in which the automatic bottom edge processing is performed=(1432+832+101)×8250×7=136.578 MB. It follows from the results that the amount of consumed memory in the second printing mode in which the automatic bottom edge processing is performed is 1.6 times the amount of consumed memory in the first printing mode in which the automatic bottom edge processing is not performed.

Analysis using RGB Image Data

A reason why the amount of consumed memory increases in the case where the automatic bottom edge processing is performed is that, as described above, the position of a final raster line of an actual printing area is required in determining which of the normal processing mode or the bottom edge processing mode is to be applied to printing on a bottom area. However, once the position of the final raster line of the actual printing area is known in advance before commencement of printing, increasing the amount of memory is not required anymore. Accordingly, in the first embodiment of the invention shown in FIG. 1, the position of a final raster line of an actual printing area relative to a printable area is specified by analyzing the RGB image data in the upward direction from a printing area end edge.

Figure 10:
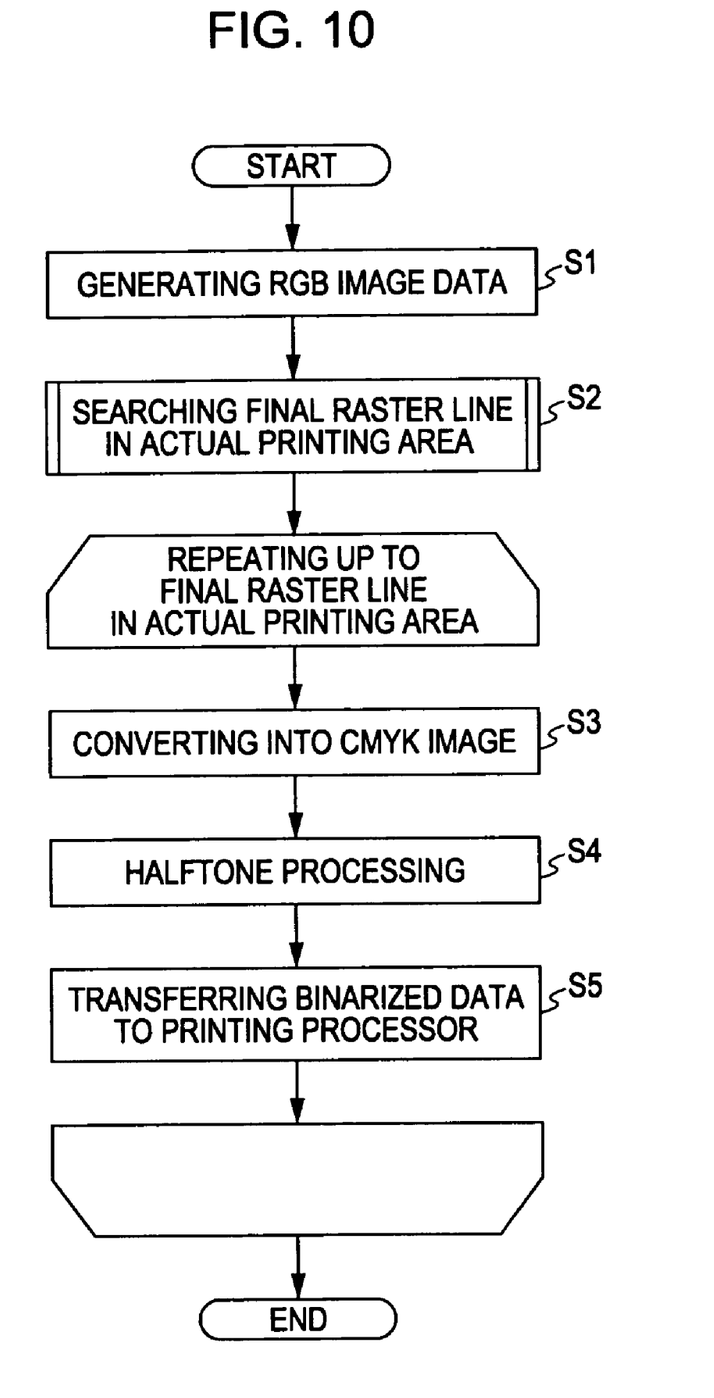
FIG. 10 is a flowchart of processes performed by a printing control device 2 shown in FIG. 2, according to a first embodiment of the invention.
Figure 11:
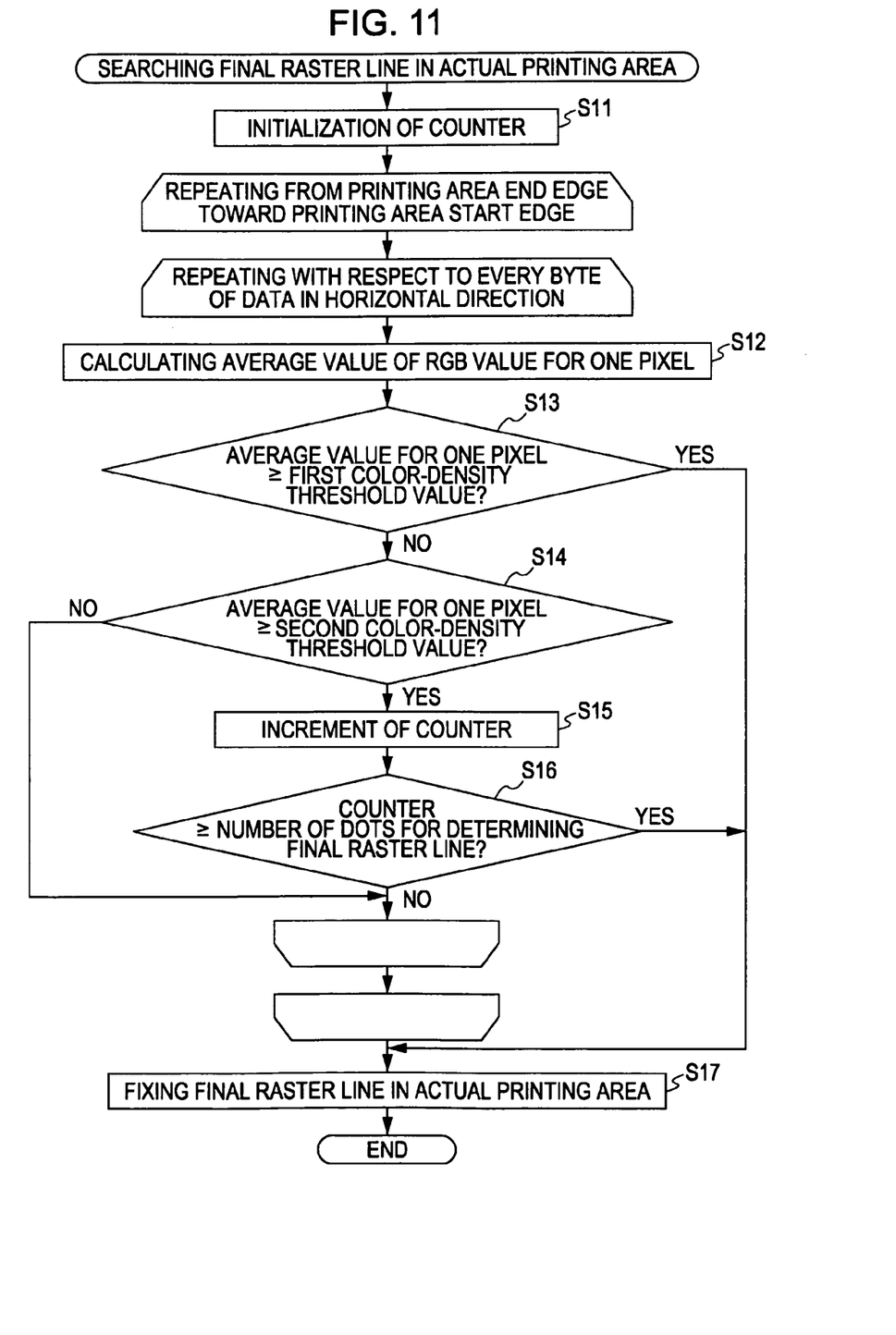
FIG. 11 is a flowchart of processes performed by a final raster line searcher, according to a first embodiment of the invention.

FIG. 10 is a flowchart of processes performed by the printing device 2 shown in FIG. 1, and further, FIG. 11 is a detailed flowchart of processes performed in one of steps included in the flowchart shown in FIG. 1, i.e., a flowchart of processes performed by the final raster line searcher 25.

In step S1, upon receipt of data to be printed, the RGB image generator 21 generates RGB image data. Subsequently, in step S2, since the size of a printable area is notified to the final raster line searcher 25 in advance, the final raster line searcher 25 analyzes the RGB image data in the upward direction from a final raster line of the printable area, and determines a raster line which is firstly recognized as a raster line included in the actual printing area to be the final raster line of the actual printing area. Subsequent to completion of searching for the final raster line of the actual printing area, in step S3, the CMYK convertor 22 converts pieces of RGB image data into pieces of CMYK data each representing densities of respective colors of inks, and further, in step S4, the halftone processor 23 performs halftone processing with respect to respective colors of inks. In step S5, from the data resulting from the halftone processing, the rasterizing processor 24 generates a block of binarized raster data required for performing one-line printing, and transfers the resultant data to the printing processor 1. The above-described processes during the steps S3 to S5 are repeated for raster lines up to the final raster line of the actual printing area. With respect to raster lines subsequent to a raster line which is determined to be a final raster line, the CMYK conversion, the halftone processing and the rasterizing processing are not performed, and thus, printing is not performed on an area below the final raster line.

Here, the rasterizing processor 24 notifies the printing processor 1 of the position of the final raster line of the actual printing area in accordance with a direction from the normal processing/bottom edge processing selector 26 when transferring a first block of raster data to the printing processor 1. The printing process controller 11 included in the printing processor 1 determines which of the normal processing or the bottom edge processing is to be performed for a bottom area when initializing individual sections of the printing processor 1.

The final raster line searcher 25 performs such a process as shown in FIG. 11 in order to search for the final raster line of the actual printing area. Firstly, in step S11, a counter used for determining the final raster line is initialized. Subsequently, in step S12, an average value of respective color values of red, green and blue colors for each pixel is obtained. This average value may be a weighted average value or a simple average value of respective color values of RGB. Alternatively, a mere additional value may be used instead of the simple average value, and hereinafter, to refer to any of these, "an average value" will be used. When the determination in step S13 is "Yes", i.e., in the case where an average value for one pixel is higher than a first predetermined color density threshold value, since it is obvious that a raster line including the pixel has data to be printed, the raster line is determined to be a final raster line of the actual printing area, and then, in step S17, the final raster line of the actual printing area is fixed. When the determination, in step S14, is "Yes", i.e., in the case where the average value obtained in step S12 is lower than the first predetermined color density threshold value and is higher than a second predetermined color density threshold value, it is determined that the pixel is possibly a pixel which requires discharging of inks, and then, in step S15, the counter is incremented. The above-described processes during steps from S12 to S15 are repeated for bytes of raster data extending in the horizontal direction along a raster line, and in the case where the number of dots which possibly require discharging of inks is more than a predetermined value, that is, in the case where the value of the counter is more than a predetermined number of dots used for determining the final raster line, i.e., when the determination is "Yes", in step S16, the position of the raster line is determined to be the position of a final raster line position of the actual printing area, and then, the flow proceeds to step S17, where the final raster line of the actual printing area is fixed. When the determination, in step S14, is "No", i.e., in the case where the average value obtained in step S12 is lower than the second predetermined color density threshold value, the process to be performed with respect to the pixel terminates, and then, the above-described processes during steps from S12 to S15 are repeated for bytes of raster data extending in the horizontal direction along a raster line, and subsequently, are repeated with respect to raster lines up to a printing area start edge. In addition, the first color density threshold value, the second color density threshold value and the number of dots used for determining the final raster line are determined in advance in accordance with each of resolutions, and further, a value represented by the first predetermined color density threshold value represents a higher probability of discharge of inks than a value represented by the second predetermined color density threshold value.

In addition, in FIG. 11, respective comparisons of the average value obtained in step S12 with the first predetermined color density threshold value and the second predetermined color density threshold value are denoted by inequality/equality signs; however, hereinbefore, a case where the average value is equal to the first predetermined color density threshold value and also a case where the average value is equal to the second predetermined color density threshold value are not described. In each of the above-described cases, i.e., in each of steps S13 and S14, it can be arbitrarily determined to which branch the flow proceeds in the case where the average value is equal to each color density threshold value.

Hereinbefore, an example in which the printing processor 1 and the printing controller 2 are combined has been described; however, the printing processor 1 can be configured so as to be a print processing device separate from the printing controller 2.

Second Embodiment of the Invention

Figure 12:
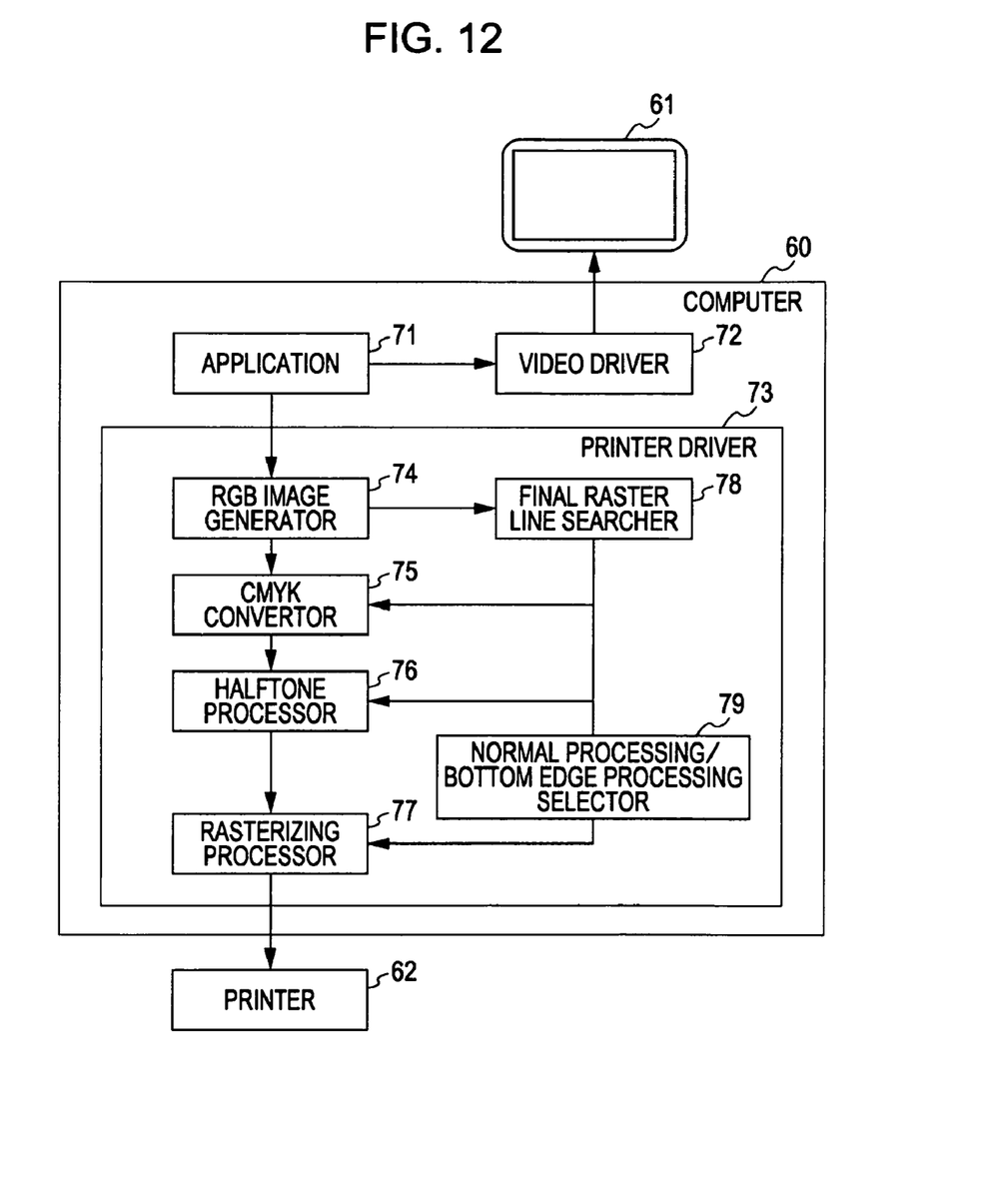
FIG. 12 is a block diagram illustrating a configuration of a second embodiment of the invention, and shows an example in which functions of a printing processor 1 shown in FIG. 1 are realized as a printer driver program.

FIG. 12 is a block diagram illustrating a configuration of a second embodiment of the invention, and shows an example in which functions of the printing processor 1 shown in FIG. 1 are realized as a printer driver program. A computer 60 includes hardware components such as a CPU, RAM chips, ROM chips, a hard disk and various types of interface units, and is connected to external devices such as a display device 61 and a printer 62. In the computer 61, various kinds of programs such as an application program 71, a video driver program 72, a printer driver program 73 are operative under a prescribed operating system. Respective functions associated with a printing process, which are executed by the above-described programs, are as described bellow: the application program 71 performs processing variously for converting, displaying and printing of image; the video driver program 72 drives the display device 61 so as to display various types of information, such as image information, textual information, video information and user interfaces related information in accordance with a direction from the application program 71; the printer driver program 73 performs processing so as to allow the printer 62 to perform printing of image information and textual information in accordance with a direction from the application program 71.

The printer driver program 73 operates as the printing controller 2 shown in FIG. 1, and includes an RGB image generator 74, a CMYK convertor 75, a halftone processor 76, a rasterizing processor 77, a final raster line searcher 78, and a normal processing/bottom edge processing selector 79. The RGB image generator 74 generates RGB image data to be printed, from inputted textual data and/or image data. The CMYK convertor 75 converts the RGB image data into CMYK data. The halftone processor 76 determines the locations to which certain kinds of color inks are to be discharged in accordance with densities of respective CMYK colors. The rasterizing processor 77 sequentially generates pieces of printing data for each raster line on a dot-by-dot basis and sends the resultant pieces of printing data for each raster line to the printer 62 as a block of raster data, and also, notifies the printer 62 of the necessity of the bottom edge processing. In association with the RGB image data generated by the RGB image generator 74, the final raster line searcher 78 searches for a final printing line position of the RGB image data on the printing medium from the end edge of a printable area of the printing medium. The normal processing/bottom edge processing selector 79 selects either of the normal processing or the bottom edge processing on the basis of the final printing line position of the RGB image data obtained by the final raster line searcher 78.

In the above-described embodiments, it is described that the final printing line position is searched on the basis of the RGB image data. This is due to an advantage in a processing speed. In the same way as or a way similar to that described above, it is also possible to search for the final printing line position on the basis of the CMYK data or the halftone data obtained by performing a dithering process, according to certain aspects of the invention, although these methods are inferior in the processing speed. Further, in the above-described embodiments, it is assumed that the RGB image data is generated from inputted textual data and/or image data, and further, is obtained by performing a resolution conversion of original RGB data supplied from computers or memory devices. In this case, if the realization of the printing device according to certain aspects of the invention depends on the amount of storage memory mounted therein, the searching of the final printing line position can be achieved on the basis of RGB image data after the resolution conversion in the case where the amount of image data is reduced after the resolution conversion, or on the basis of RGB image data before the resolution conversion in the case where the amount of image data increases after the resolution conversion. Moreover, the foregoing embodiments are described by way of an example of a configuration in which the printing is performed by using a print head which discharges certain kinds of ink. In this configuration, it is also possible to realize the printing device according to an aspect of the invention, in which any kind of printing head is used if the printing device is configured so as to be capable of printing by changing the transport amount of a printing medium. Furthermore, it is possible to realize the printing device according to certain aspects of the invention, in which the printing is performed by using not inks in liquid condition but materials in gas or solid condition such as fine particles, including vaporized coloring materials.

The entire disclosure of Japanese Patent Application No: 2008-054460, filed Mar. 5, 2008 is expressly incorporated by reference herein.

What is claimed is:
1. A printing device, comprising:
a printing process section configured so as to be capable of performing a first printing process in which, in synchronization with transporting of a printing medium performed at intervals of a predetermined constant transport amount, respective printing operations are performed on the printing medium, and a second printing process in which, in synchronization with transporting of the printing medium performed at intervals of a smaller constant transport amount than the predetermined constant transport amount, respective printing operations are performed on the printing medium;
a searching section configured to search for a final printing line position of printing image data to be printed on the printing medium from an end edge of a printable area on the printing medium; and
a selecting section configured to select either of the first printing process or the second printing process in accordance with the final printing line position of the printing image data obtained by the searching section;
wherein the printing image data targeted for searching performed by the searching section includes pieces of image data each representing respective color values of red, green, and blue colors for one pixel.

2. The printing device according to claim 1, further comprising:
a transporting mechanism configured to transport the printing medium at the upstream side of the transporting direction of the printing medium; and
a print head configured to perform printing in conjunction with moving in a direction orthogonal to the transporting direction, wherein the selecting section selects the first printing process in the case where the final printing line position of the printing image data does not reach a second reference position, selects the second printing process in the case where the final printing line position of the printing image data reaches the second reference position, or exceeds the second reference position but does not reach a first reference position, and selects the first printing process in the case where the final printing line position of the printing image data reaches the first reference position or exceeds the first reference position, wherein the first reference position is a line position on the printing medium corresponding to a timing at which an end edge of the printing medium in the transporting direction is released from the transporting mechanism, and wherein the second reference position is a line position at which changing from the first printing process to the second printing process is required so as to allow the print head to perform printing under the condition where the position of the print head does not exceed the first reference position.

3. The printing device according to claim 1, wherein the searching section is configured to obtain an average value of respective color values of red, green and blue colors for each pixel included in the printing image data; in the case where the average value associated with a pixel is higher than or equal to a first predetermined color density threshold value, determine the line position of the pixel to be a final printing line position of the image data; in the case where the average value associated with a pixel is lower than the first predetermined color density threshold value and is higher than or equal to a second predetermined color density value which is smaller than the first predetermined color density threshold value, regard the pixel as a pixel corresponding to a dot which possibly requires discharging of an ink; and in the case where the ink is more than or equal to a value determined in advance for dots located in the same direction orthogonal to the transporting direction, determine a line position at which pixels corresponding to the dots are arranged to be a final printing line position of the image data.

4. A control method used for a printing device configured so as to be capable of performing a first printing process in which, in synchronization with transporting of a printing medium performed at intervals of a predetermined constant transport amount, respective printing operations are performed on the printing medium, and a second printing process in which, in synchronization with transporting of the printing medium performed at intervals of a smaller constant transport amount than the predetermined constant transport amount, respective printing operations are performed on the printing medium, the control method comprising:

searching for a final printing line position of printing image data to be printed on the printing medium from an end edge of a printable area on the printing medium; and selecting either of the first printing process or the second printing process in accordance with the final printing line position of the printing image data obtained in the searching method;

wherein the printing image data targeted for searching includes pieces of image data each representing respective color values of red, green, and blue colors for one pixel.

5. A printing control device for performing control of a printing device configured so as to be capable of performing a first printing process in which, in synchronization with transporting of a printing medium performed at intervals of a predetermined constant transport amount, respective printing operations are performed on the printing medium, and a second printing process in which, in synchronization with transporting of the printing medium performed at intervals of a smaller constant transport amount than the predetermined constant transport amount, respective printing operations are performed on the printing medium, the printing control device comprising:

a searching section configured to search for a final printing line position of printing image data to be printed on the printing medium from an end edge of a printable area on the printing medium; and a selecting section configured to select either of the first printing process or the second printing process in accordance with the final printing line position of the printing image data obtained by the searching section wherein the printing image data targeted for searching performed by the searching section includes pieces of image data each representing respective color values of red, green, and blue colors for one pixel.

6. A printing device control program executed by a computer for performing control of a printing device configured so as to be capable of performing a first printing process in which, in synchronization with transporting of a printing medium performed at intervals of a predetermined constant transport amount, respective printing operations are performed on the printing medium, and a second printing process in which, in synchronization with transporting of the printing medium performed at intervals of a smaller constant transport amount than the predetermined constant transport amount, respective printing operations are performed on the printing medium, the printing device control program comprising:

a searching process for searching for a final printing line position of printing image data to be printed on the printing medium from an end edge of a printable area on the printing medium; and a selecting process for selecting either of the first printing process or the second printing process in accordance with the final printing line position of the printing image data obtained in the searching process;

wherein the printing image data targeted for searching performed by the searching section includes pieces of image data each representing respective color values of red, green, and blue colors for one pixel.

* * * * *